United States Patent [19]

Jansen et al.

[11] 4,303,571

[45] Dec. 1, 1981

[54] FILM-FORMING THERMOPLASTIC ELASTOMERIC POLYMER COMPOSITIONS

[75] Inventors: Deborah S. Jansen, East Windsor; Robert C. Puydak, East Orange, both of N.J.

[73] Assignee: Exxon Research & Engineering Co., Florham Park, N.J.

[21] Appl. No.: 112,179

[22] Filed: Jan. 17, 1980

[51] Int. Cl.$^3$ ............................................. C08K 5/01
[52] U.S. Cl. ........................ 260/33.6 AQ; 264/299; 264/331.13; 264/331.15; 264/500
[58] Field of Search ....... 260/23.5 A, 23 H, 33.6 AQ; 525/211, 222

[56] References Cited

U.S. PATENT DOCUMENTS

| | | | |
|---|---|---|---|
| 3,821,333 | 6/1974 | Goodwin et al. | 525/222 |
| 3,849,333 | 11/1974 | Lloyd et al. | 525/211 |
| 3,941,859 | 3/1976 | Batiuk et al. | 260/23.5 A |
| 4,102,855 | 7/1978 | Kuan et al. | 260/42.33 |
| 4,131,654 | 12/1978 | Herman et al. | 260/23.5 A |
| 4,153,589 | 5/1979 | Triolo | 260/33.6 AQ |
| 4,212,787 | 7/1980 | Matsuda et al. | 260/33.6 AQ |
| 4,243,576 | 1/1981 | Fischer et al. | 525/211 |

FOREIGN PATENT DOCUMENTS 2012281 7/1979 United Kingdom .

*Primary Examiner*—Lewis T. Jacobs
*Attorney, Agent, or Firm*—John J. Mahon; Harvey L. Cohen

[57] ABSTRACT

There are disclosed film-forming polymer blends useful for the production of tubular blown film comprising EPM or EPDM elastomers, ethylene-vinyl acetate copolymers and a hydrocarbon oil plasticizer. The films exhibit resiliency and elasticity and high melt flow properties.

13 Claims, No Drawings

FILM-FORMING THERMOPLASTIC ELASTOMERIC POLYMER COMPOSITIONS

This invention relates to the thermoplastic elastomeric polymer blends which have film-forming capabilities. More particularly, the invention relates to a film-forming blend of EPM or EPDM elastomer, thermoplastic ethylene-vinyl acetate copolymer resin and a hydrocarbon process oil, the blended composition being capable of processing in a tubular blown film apparatus.

Compositions containing EPM or EPDM elastomers, ethylene-vinyl acetate and hydrocarbon extender oils are known and are disclosed, for example, in German published application No. 2822815 (1975) and Chemical Abstracts No. 90:169998a by Mitsui Petrochemical Industries, Ltd., the compositions being cured with a peroxide to form extrudable or injection moldable pellets.

Also, U.S. Pat. No. 3,941,859 issued to Batiuk et al. on Mar. 2, 1976, discloses blends of EPDM polymers, polyethylene and ethylene-vinyl acetate, which are not cured and which are said to be useful for tubing, liners and molded products. The use of plasticizers and extenders is noted with the comment that such materials can detract from tensile strength.

In British application No. 2,012,281, A. Romey et al. disclose a mixture of olefin copolymer rubber, liquified coal product and ethylene-vinyl acetate useful as sealants and coatings.

In U.S. Pat. No. 4,102,855, issued to Kuan et al. on July 25, 1978, there are disclosed blends of EPDM polymers ethylene-vinyl acetate copolymers and poly alpha-methyl styrene which are processable compositions useful for making injected moldable structural components.

These references, while disclosing various blends containing some components used in the present invention, all fail to disclose film-forming compositions and films made therefrom as disclosed herein.

In accordance with the present invention, there is provided a film-forming, thermoplastic elastomeric polymer blend composition consisting essentially of:

(a) about 25 to 55 parts by weight of an EPM or EPDM elastomer;

(b) about 35 to 55 parts by weight of ethylene-vinyl acetate copolymer resin containing about 9 to 40% by weight vinyl acetate; and (c) about 15 to 25 parts by weight of a normally liquid hydrocarbon process oil, the oil being an aromatic, highly aromatic, naphthenic or parafinic process extender oil, the blend composition containing at least 4.5% by weight of vinyl acetate based upon the weight of the total composition and the blend composition having a melt index at 190° C. of about 0.5 to 15.0 gm./10 min.

A further embodiment of the present invention comprises the aforesaid (a), (b) and (c) ingredients, together with (d) about 0 to 30 parts by weight of calcium carbonate as a filler and opacifying agent and (e) about 0.5 to 2% by weight of a film processing slip agent or abherent based upon the weight of the total blend composition.

The elastomeric polymer component to be used in the composition of the present invention may be either an EPM (ASTM D-1418-72a designation for an ethylene-propylene elastomer copolymer), or an EPDM (ASTM D-1418-72a designation for an ethylene-propylene-diene elastomer terpolymer). Both EPM and EPDM are equally suitable for use in the present invention. Since no curing is involved, the nonconjugated diene present in the EPDM does not add or detract from the performance of the compositions prepared according to the present invention. Typical nonconjugated dienes employed in EPDM polymers are hexadiene, dicyclopentadiene, ethylidene norbornene, methylene norbornene, propylidene norbornene and methyltetrahydroindene. EPDM's with ethylidene norbornene have been used in formulating compositions of the present invention. The EPM and EPDM polymers used in the present invention should have an ethylene content of about 55 to about 70 weight percent, preferably about 60 to 70 weight percent, and a Mooney viscosity (ML 1+8 at 260° F.) between about 25 and 80. Oil-extended EPM and EPDM polymers may also be used if their Mooney viscosity falls within this range in the oil-extended state.

The ethylene-vinyl acetate copolymers useful in the present invention are those thermoplastic resins having a vinyl acetate content between about 9% and 28% by weight. Sufficient ethylene-vinyl acetate copolymer resin must be employed so that the final overall blended composition has a vinyl acetate content of at least 4.5% by weight. This level of vinyl acetate has been found required to act in combination with the plasticizing oil to impart a sufficient melt index to the film, aid in accommodating the oil without bleeding and to achieve a high level of stretch and recovery to the film.

Hydrocarbon oils useful in the present invention function as process aids whose activity is uniquely enhanced in the presence of vinyl acetate copolymers, as plasticizers producing low modulus and enhanced elasticity in the solid state and those useful are the normally liquid hydrocarbon processing and extender oils (ASTM D 2226) categorized as aromatic, highly aromatic, naphthenic and paraffinic process oils of a medium viscosity range. Oils sold under the trademarks "Flexon" and "Sunpar" have been found especially useful.

The blended composition of the present invention exhibits excellent melt strength, and therefore may be manufactured into films using the conventional tubular blown-bubble extrusion process. In this process, which is widely used for the manufacture of polyethylene film, a tube of molten film is extruded from an upright annular die surrounding a blowhead, which inflates the tube, the inflated tube being cooled with externally blown air. Thereafter, the tube is collapsed and wound on two rolls. The air is trapped in the bubble by the die at one end and the takeup rolls at the other. The blends of the present invention are significant in that they exhibit sufficiently high melt strength combined with sufficiently high flow, as indicated by melt index, to permit manufacture into films using this conventional blown-bubble extrusion process. The melt index of the film-forming blend composition of the present invention should be in the area of about 0.5 to 15.0 gm./10 min. at 190° C. to maintain stability for processing in the tubular blown film apparatus.

The melt strength and flow characteristics of these compositions can also be beneficially employed in other methods of film manufacture such as the cast or chill-roll process, sheet extrusion or extrusion coating. Such films prepared from the compositions of the present invention are further embodiment of the present invention and offer a number of distinct properties. These films exhibit rubber-like properties of high resilience and recovery after stretching, low stress relaxation, heat shrinkability and acceptable tear strength. These properties render these films adaptable to a wide variety of uses not possible with conventional polyolefin plastics films.

Elasticity of films prepared in the present invention is indicated by an Elastic Modulus value (at 125% extension, 5 in./min. crosshead speed) of about 250 to 400 psi, with a value of about 250 psi having been found highly desirable. The films prepared from the compositions of the present invention have ultimate elongation values of about 100% to 300% and are also heat shrinkable, with 75% to 100% recovery of properties after heat shrinking 5 seconds at 100° C.

Films prepared from the compositions of the present invention are a further embodiment thereof and offer a desirable combination of properties in the unoriented and oriented states. Unoriented films have high resilience, recovery after stretching and low stress relaxation. Unaxial orientation of the film will result in a second state also having high elasticity and recovery. The films also offer the advantage of being heat shrinkable. Exposure of an oriented film to heat results in a return to the unoriented state and the original elastic properties. These properties render these films useful for a variety of wrapping, packaging and electrical insulation applications.

Preferred film-forming compositions are those containing EPM or EPDM elastomers having at least 60 weight percent ethylene and a molecular weight sufficient to provide a Mooney viscosity of about 50 ASTM D 1646 (ML 1+8 at 127° C.). Preferred ethylene-vinyl acetate copolymers are those containing about 14% to 28% by weight vinyl acetate. Aromatic, naphthenic or paraffinic hydrocarbon plasticizer oils may be used. Paraffinic and naphthenic grades are commonly lighter in color and lower in odor and therefore preferable. Aromatic oils are generally more compatible with other components and exhibit less surface migration when used at high percentages.

Calcium carbonate is an optional material for use in the compositions of the present invention and functions chiefly as a filler to reduce component cost. It may be used in fairly substantial amounts, up to about 30 parts by weight. It has been found useful in reducing film blocking, and it will impart an off-white cloudy appearance to the film. Calcium carbonate will also reduce tackiness in the finished film product.

Film processing slip agents or abherents are optional but preferable components of the compositions of the present inventions. These materials are well known in the art and are commonly employed in film manufacture as processing aids. Numerous materials are suitable but stearic acid and stearic acid derivatives such as calcium or zinc stearate or stearamide are particularly preferred. Other abherents suitable include the $C_{12}$-$C_{22}$ fatty acids and fatty acid amides and metal soaps, such as erucamide, silicones and natural and manufactured waxes such as glyceryl and glycol stearates, as well as inorganic abherent materials.

Preferred proportions for preparing the blends of the present invention are (a) 25-30 parts by weight of EPM or EPDM; (b) 45-55 parts by weight of ethylene-vinyl acetate copolymer; (c) 18-22 parts by weight of hydrocarbon oil and about 1.0% by weight of abherent, especially stearic acid.

For a composition containing calcium carbonate filler, the preferred proportions are (a) about 20-25 parts of weight of EPM or EPDM; (b) 15-20 parts by weight of hydrocarbon oil; (c) 25-40 parts by weight of ethylene-vinyl acetate copolymer; (d) 20-25 parts by weight of calcium carbonate; and (e) about 1.0% by weight of stearic acid.

The invention is further illustrated by the following examples, which are not to be considered as limitative of its scope. Parts reported are by weight.

EXAMPLE 1

Films were prepared and evaluated as set forth in Table 1, which reports Examples 1-A to 1-G. Materials used are identified below:

"EPDM A" is an EPDM containing 64 weight percent ethylene, 3.4% ethylidene norbornene and having a Mooney viscosity of 50 (ML 1+8 at 127° C.).

"Flexon 785" is a naphthenic rubber compounding oil, ASTM D 2246 Type 104A having an approximate viscosity in Saybolt seconds at 210° F. of 80.

"EPDM B" is an oil extended EPDM consisting of 75 parts by weight of paraffinic rubber processing oil with 100 parts of a high molecular weight EPDM containing 66% ethylene and having an overall Mooney viscosity of 45 (ML 1+8 at 127° C.).

EVA represents ethylene-vinyl acetate copolymer.

VA represents vinyl acetate.

MI represents Melt Index measured at 190° C. according to ASTM D-1238, Condition E.

"Flexon" is a trademark for petroleum oils marketed, respectively, by Exxon Chemical Company and Exxon Company U.S.A.

"LD 401" is a product of Exxon Chemical Company; "UE 632" and "UE 621" are products of U.S.I. Chemicals and "Elvax 265" is a product of DuPont.

All films reported in the tables below were produced by the blown-bubble extrusion process as described hereinabove. Film Tensile Set is a measure of the degree of elastic recovery of the films. Low values indicate more complete recovery.

TABLE I

|  | 1-A | 1-B | 1-C | 1-D | 1-E | 1-F | 1-G |
|---|---|---|---|---|---|---|---|
| EPDM A | 34 | 48 | 48 | — | — | — | — |
| Oil (Flexon 785) | 15 | 21 | 21 | — | — | — | — |
| EPDM B | — | — | — | 49 | 49 | 49 | 49 |
| EVA Copolymer, 9% VA, 3.4 MI (LD-401) | 50 | 30 | — | 50 | — | — | — |
| EVA Copolymer, 14% VA, 7.5 MI (UE-632) | — | — | — | — | 50 | — | — |
| EVA Copolymer, 18% VA, 2.5 MI (UE-621) | — | — | 30 | — | — | 50 | — |
| EVA Copolymer, 28% VA, 3.0 MI (Elvax 265) | — | — | — | — | — | — | 50 |
| Stearic Acid | 1 | 1 | 1 | 1 | 1 | 1 | 1 |
| Melt Index @ 190° C., g/10 min (ASTM D 1238, Condition E) | 1.6 | 1.2 | 1.9 | 1.3 | 7.0 | 3.6 | 3.8 |
| Film Tensile Set, 100% Elongation, ASTM D412 | | | | | | | |
| Machine Direction, (%) | 20 | 11 | 10 | 11 | 12 | 13 | 17 |
| Transverse Direction, (%) | 24 | 13 | 18 | 13 | 11 | 19 | 22 |

EXAMPLE 2

Additional films were prepared as in Example 1. Elastic Modulus Melt Index and Degree of Oil Migration were evaluated. The compositions and results are in Table II.

LDPE represents low density polyethylene. Examples 2-A and 2-D are included for the purpose of comparison.

"EY 901", "UE 631" and "UE 645" are products of U.S.I. Chemicals.

TABLE II

|  | 2-A | 2-B | 2-C | 2-D | 2-E | 2-F | 2-G |
|---|---|---|---|---|---|---|---|
| EPDM A | 28 | 28 | 28 | 28 | 28 | 28 | 28 |
| Oil (Flexon 815) | 21 | 21 | 21 | 21 | 21 | 21 | 21 |
| Stearic Acid | 1 | 1 | 1 | 1 | 1 | 1 | 1 |
| LDPE, 7.2 MI (LD 605) | 50 | — | — | — | — | — | — |
| EVA Copolymer, 14% VA, 7.5 MI (UE-632) | — | 50 | — | — | — | — | — |
| EVA Copolymer, 40% VA, 7.5 MI (EY-901) | — | — | 50 | — | — | — | — |
| LDPE, 2.5 MI (LD-106) | — | — | — | 50 | — | — | — |
| EVA Copolymer, 9% VA, 3.4 MI (LD-401) | — | — | — | — | 50 | — | — |
| EVA Copolymer, 19% VA, 2.5 MI (UE-631) | — | — | — | — | — | 50 | — |
| EVA Copolymer, 28% VA, 3.0 MI (UE-645) | — | — | — | — | — | — | 50 |
| Vinyl Acetate Content (% final blend) | 0 | 7 | 20 | 0 | 4.5 | 9.5 | 14 |
| Melt Index @ 190° C., g/10 min (ASTM D 1238) (Condition E) | 3.1 | 11.5 | 13.2 | 2.0 | 2.8 | 5.9 | 6.5 |
| Elastic Modulus @ 125% extension 5 in/min crosshead speed (psi) | NA | 250 | 160 | NA | 420 | 260 | 260 |
| Degree of Oil Migration to Surface | High | Low | None | High | Moderate | None | None |

EXAMPLE 3

Additional films were prepared and evaluated as in Example 2 and are reported in Table III. Examples 3-A and 3-D are for the purpose of comparison.

TABLE III

|  | 3-A | 3-B | 3-C | 3-D | 3-E | 3-F | 3-G |
|---|---|---|---|---|---|---|---|
| EPDM B | 49 | 49 | 49 | 49 | 49 | 49 | 49 |
| Stearic Acid | 1 | 1 | 1 | 1 | 1 | 1 | 1 |
| LDPE, 7.2 MI (LD-605) | 50 | — | — | — | — | — | — |
| EVA Copolymer, 14% VA, 7.5 MI (UE-632) | — | 50 | — | — | — | — | — |
| VAE Copolymer, 40% VA, 7.5 MI (EY-901) | — | — | 50 | — | — | — | — |
| LDPE, 2.5 MI (LD-106) | — | — | — | 50 | — | — | — |
| EVA Copolymer, 9% VA, 3.4 MI (LD-401) | — | — | — | — | 50 | — | — |
| EVA Copolymer, 18% VA, 2.5 MI (UE-621) | — | — | — | — | — | 50 | — |
| EVA Copolymer 28% VA, 3.0 MI (UE-645) | — | — | — | — | — | — | 50 |
| Vinyl Acetate Content (% Final blend) | 0 | 7 | 20 | 0 | 4.5 | 9 | 14 |
| Melt Index @ 190° C., g/10 min (Cond. E) | 0.57 | 6.6 | 5.4 | 0.41 | 1.3 | 3.6 | 2.8 |
| Elastic Modulus @ 125% Extension 5 in/min crosshead speed (psi) | NA | 280 | 110 | NA | 390 | 330 | 230 |
| Degree of Oil Migration to Surface | Moderate | None | None | Moderate | None | None | None |

What is claimed is:

1. A film-forming thermoplastic elastomeric blend composition consisting essentially of a blend of:
   (a) about 25 to 55 parts by weight of an EPM or EPDM elastomer having an ethylene content of from about 55 to 70 weight percent;
   (b) about 35 to 55 parts by weight of a thermoplastic ethylene-vinyl acetate copolymer having a vinyl acetate content of about 9 to 40% by weight; and
   (c) about 15 to 25 parts by weight of a normally liquid hydrocarbon process oil, the oil being an aromatic, highly aromatic, naphthenic or paraffinic process or extender oil, the blend composition containing at least 4.5% by weight vinyl acetate based upon the total weight of the blend composition and the blend composition having a melt index at 190° C. of about 0.5 to 15 gm./10 min.

2. The composition of claim 1 further comprising (d) about 0 to 30 parts by weight of calcium carbonate filler and (e) about 0.5 to 2.0% by weight of a film processing abherent based on the total composition.

3. A film produced from the composition of claim 1.

4. A film produced from the composition of claim 1 by the blown-bubble extrusion method.

5. A film produced from the composition of claim 1 by the cast or chill roll film extrusion method.

6. A film according to claim 4 having an Elastic Modulus of about 250 to 400 psi.

7. The composition of claim 1 wherein said (a) component is an EPM elastomer.

8. The composition of claim 1 wherein said (a) component is an EPDM elastomer, the diene being ethylidene norbornene.

9. The composition of claim 1 wherein said (b) component has a vinyl acetate content of about 14% to 18% by weight.

10. The composition of claim 1 wherein said (c) component is an aromatic or highly aromatic hydrocarbon oil.

11. The composition of claim 2 wherein said (e) component is stearic acid.

12. The composition of claim 1 wherein there is present about 25 to 30 parts by weight of said (a) component; about 45 to 55 parts by weight of said (b) component; about 18 to 22 parts by weight of said (c) component; and further comprising about 1% by weight of stearic acid based on the total weight of the blend composition.

13. The composition of claim 2 wherein there is present about 20 to 25 parts by weight of said (a) component; about 15 to 20 parts by weight of said (b) component; about 25 to 40 parts by weight of said (c) component; about 20 to 25 parts by weight of said (d) component, and about 1% by weight of said (e) component.

* * * * *